United States Patent [19]

Kay et al.

[11] Patent Number: 4,552,536

[45] Date of Patent: Nov. 12, 1985

[54] PROGRAMMED LEARNING TEXTBOOK

[76] Inventors: Andrew F. Kay, 320 Serpentine Dr., Del Mar, Calif. 92014; David A. Kay, 1745 Valdez Dr., La Jolla, Calif. 92037

[21] Appl. No.: 630,298

[22] Filed: Jul. 12, 1984

[51] Int. Cl.⁴ .............................................. G09B 3/06
[52] U.S. Cl. ................................................ 434/327
[58] Field of Search .............. 434/327, 328, 331, 340, 434/341, 346, 348, 349, 178, 113

[56] References Cited

U.S. PATENT DOCUMENTS 2,410,800  11/1946  Baumgartner ....................... 434/327
3,055,117   9/1962  Bernstein et al. ................... 434/346
3,571,951   3/1971  Siegel et al. ........................ 434/178

Primary Examiner—William H. Grieb
Attorney, Agent, or Firm—Fulwider, Patton, Rieber, Lee & Utecht

[57] ABSTRACT

A programmed learning text including self-test questions for providing immediate feedback to the student on what he has learned. Each question is followed by a plurality of possible answers. Adjacent to each such possible answer is a mottled design printed on the paper. Indentations in the paper, which indentations are concealed by the mottled design, distinguish the correct answer from the wrong answers. After selecting one of the choices, the student touches the mottled design to find out whether his choice is the correct one.

13 Claims, 3 Drawing Figures

U.S. Patent  Nov. 12, 1985  4,552,536
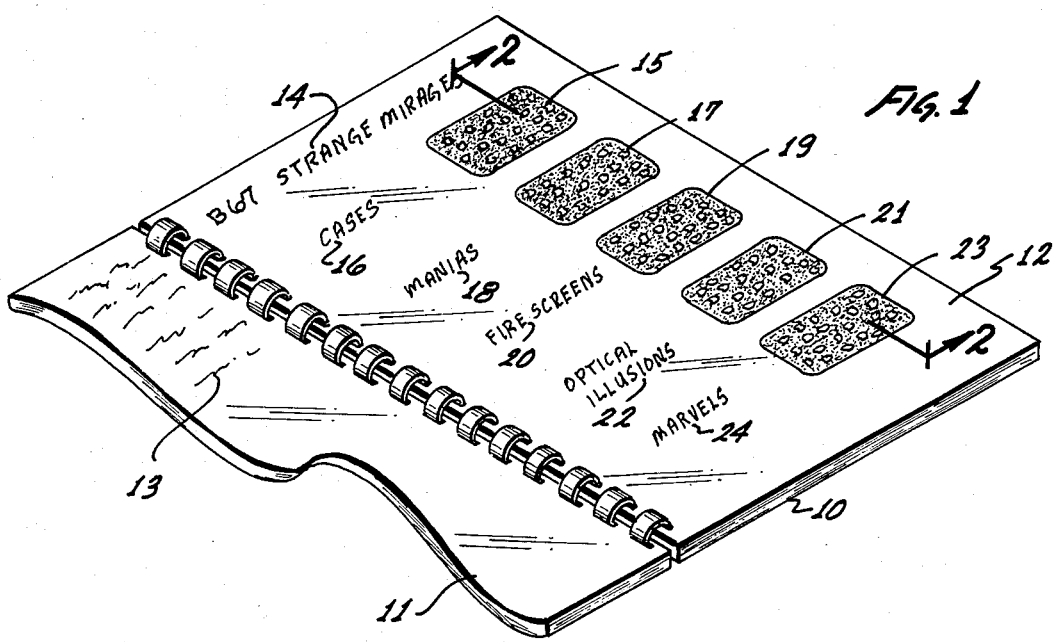
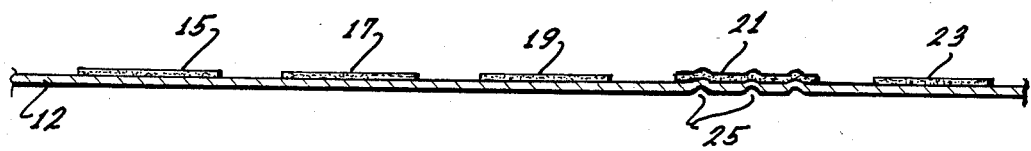
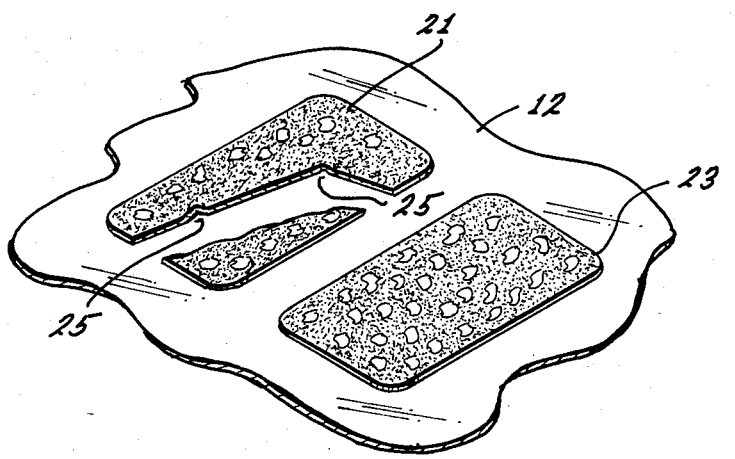

PROGRAMMED LEARNING TEXTBOOK

BACKGROUND OF THE INVENTION

1. Field of the Invention

This invention is in the general field of educational materials, and more particularly in the field of textbooks.

A conventional textbook contains text material for a student to study. When such a book is used as part of a course of study, the student will learn, not only from the book, but also from interaction with the teacher and from quizzes and examinations. The student receives, from the teacher and from the examinations, feedback on what he has learned and on what he has not learned. Such feedback is an essential part of the learning process. A student who attempts to learn a subject from a conventional textbook without feedback from the teacher or from examinations generally does not learn as much or as well as does a student who has the benefit of such feedback.

In recent years, educators have sought to provide a means whereby the student can obtain feedback directly from the textbook itself. Such feedback complements the feedback which the student receives from the teacher and from the examinations. In addition, students who must study without the benefit of a teacher can learn the subject faster and more thoroughly by using a textbook which provides feedback on what the student has learned.

2. The Prior Art

One kind of textbook which gives a student feedback on how well he has learned the text material is called a "programmed instruction" textbook. A textbook written using programmed instruction presents new material a little at a time and then quizzes the student on what he has just learned. By quizzing the student after he has studied each little bit of new material, and then giving immediate feedback, the learning process is enhanced.

The physical arrangement of a programmed instruction text consists of one or more sentences of text followed by one or more questions about the subject matter of the immediately preceding text material. The student answers the questions by handwriting the answers into the book. Then the student checks his answers.

In some programmed instruction texts, the student must turn to a different page in order to check his answers. In others, the answers are printed on the same page as the questions, and the student must always keep the "answers" part of the page covered until he is ready to check his work.

The system of programmed learning as just described has several drawbacks. First, the textbook can only be used once, because once the student has marked his answers in the book, the book is permanently defaced and then no other student can use the book. Even if a pencil is used, it is not possible completely to erase the answers, and the next person to use the book can see how the previous reader answered the questions.

In addition, both methods for checking answers are clumsy. There is a need for the student to be able to study a programmed text without having to keep part of the page covered all the time, and without having to keep skipping back and forth from one page to another every time it is necessary to check answers.

Also, when a student uses such a programmed learning text, once he has made one attempt to answer a question he is given the correct answer and then gets no further benefit from that particular question. If, on the other hand, when the student made a wrong first choice he were to be told only that his first attempt was wrong, he could still benefit from further study and from trying to figure out the correct answer from the remaining choices.

SUMMARY of the INVENTION

We have found that small projections, such as those embossed into paper by a Braille printer, are easy to see if they are embossed into a plain white sheet of paper, but such projections can be camouflaged by printing a mottled black-and-gray design over them. However, a person easily can feel the presence of these projections regardless of whether anything is printed on the paper. Our invention exploits this principle.

In our invention, text material is followed by one or more multiple choice questions. Printed below each question are the various answer choices, only one of which is the correct answer to the question. Next to each choice, on a portion of the page approximately the size of a postage stamp, is printed a mottled black-and-gray design.

The paper under the mottled design next to the correct choice has embossed into it one or more projections. The paper under all the other mottled designs is smooth. When the student looks at the choices, he cannot see which is the correct choice because the mottled design camouflages the projections, concealing them from view. However, when he touches the mottled design next to each choice, he can determine by feel which is the correct choice, because only the correct choice has the projections.

By using our invention, the student can receive immediate feedback as to whether he has selected the correct answer, and he can do so without either skipping back and forth from page to page or having to keep part of each page covered while he reads.

A student using a book which practices our invention does not have to write anything in the book. Thus, since the student makes no marks in the book, the book can be used by many students rather than only by one. In addition, by using such a book, the student finds out only whether his first choice of answer was correct because he touches only the mottled design next to that one choice. If his first choice was wrong, he can still try to figure out which of the remaining choices is correct and hence he gets further benefit from studying and trying to answer the question. With other programmed texts, after making one attempt the student is given the correct answer and then gets no further benefit from that particular question.

It is a known principle of learning that a student learns better if information is presented to more than one of his senses. Unlike most textbooks, which appeal only to the sense of sight, a textbook which incorporates our invention communicates through the sense of touch as well as the sense of sight. Hence, a student who studies using such a book can be expected to learn the subject more rapidly and more thoroughly than a student who studies using a conventional textbook.

Other objects and advantages of this invention will be apparent to those skilled in the art upon a consideration of the description and drawings herein.

BRIEF DESCRIPTION of the DRAWINGS

FIG. 1 is a view of a textbook embodying our invention, opened to a typical page.

FIG. 2 is a cross-section of the page along the line 2—2 of FIG. 1.

FIG. 3 is a sectional illustration of the projections within the mottled design.

DESCRIPTION of the PREFERRED EMBODIMENT

In FIG. 1, a textbook 10 embodying our invention is shown opened to a typical page 12. Text 13 is printed on preceding page 11. At the top of page 12 is multiple choice question 14 followed by choices 16, 18, 20, 22 and 24. Printed next to choice 16 is mottled design 15, and each of the other choices also has a mottled design printed next to it.

The subject matter of the text as illustrated is English vocabulary. The student is to select the choice which is closest in meaning to the phrase given as multiple choice question 14. The correct choice is 22. The paper under mottled design 21, which is next to choice 22, has embossed into it a plurality of projections; the paper under mottled designs 15, 17, 19, and 23 is smooth to the touch.

Referring now to FIG. 2, a cross-section of page 12 is shown. Projections 25 are embossed in the paper under mottled design 21. The paper under mottled designs 15, 17, 19, and 23 is smooth.

FIG. 3 shows a section line through part of mottled design 21, again showing projections 25.

It will be apparent that the arrangement of the different elements on the page can be varied. For example, any of the choices, rather than the fourth from the top, could be the correct one. Text 13 could be printed on the same page with the question and the answer choices. More or less than five choices could be presented as possible answers to a question. More than one question, together with its associated answer choices, could be printed on one page. It would even be possible for more than one answer choice to be correct, in which case the mottled design next to each correct choice would have the projections and the student would be instructed to choose all of the choices which would be correct answers.

It will also be apparent that our invention is not limited to the subject of English vocabulary. Rather, this invention can be used to present almost any subject to a student for study.

In the preferred embodiment as illustrated and described, the projections appear opposite the correct answer, and the paper is smooth next to all the incorrect answers. However, the reverse arrangement would work equally well—that is, the paper next to the correct answer could be smooth, and the indentations could be placed next to all the incorrect answers. It would also be possible to make use of a variation in the pattern of projections, with one such variation appearing next to the correct answer and a different variation appearing next to each incorrect answer.

We have illustrated and described one embodiment of our invention. However, the invention is not to be limited to the specific forms or arrangements of parts as illustrated and described herein.

Having thusly described the invention,
We claim:

1. A programmed learning text having a plurality of pages and a self-test question, comprising:
    a plurality of possible answers to said question, the answers being printed on one of said pages, at least one of said ansers being a correct answer to said question;
    means on said page adjacent said answers for identifying each correct answer by touch; and
    camouflaging means on said page for visually camouflaging said identifying means.

2. A programmed learning text according to claim 1, wherein the camouflaing means comprises a predetermined pattern printed on said page.

3. A programmed learning text having a plurality of pages and a self-test question, comprising:
    a plurality of possible answers to said question, the answers being printed on one of said pages, at least one of said answers being a correct answer to said question;
    at least one projection embossed in said page adjacent said answers for identifying each correct answer by touch; and
    camouflaging means on said page for visually camouflaging said projection.

4. A programmed learning text according to claim 3, wherein the camouflaging means comprises a predetermined pattern printed on said page surrounding said projection.

5. A programmed learning text according to claim 4, wherein said pattern is a mottled design of a plurality of shades of at least one color.

6. A programmed learning text for learning the answer to a self-test question, comprising:
    a sheet of material having a plurality of adjacent indicia corresponding to a plurality of possible answers to said self-test question, at least one of said indicia corresponding to a correct answer to said question and at least one of said indicia corresponding to a wrong answer thereto;
    a plurality of projections, perceptible by touch, arranged in a first predetermined pattern embossed in the page adjacent each said indicia corresponding to a wrong answer;
    a plurality of projections, perceptible by touch, arranged in a second predetermined pattern embossed in the page adjacent each said indicia corresponding to a correct answer; and
    camouflage means upon said projections, visually camouflaging the presence of said projections, said camouflaging means not interfering with the touch perceptibility of said projections.

7. In a programmed learning textbook, of the kind having a plurality of multiple-choice self-test questions, some of said questions having a plurality of adjacent indicia corresponding to a plurality of possible answers on at least one page of the textbook, the improvement comprising:
    at least one projection, perceptible by touch, embossed in said page adjacent one of said indicia; and
    camouflaging means upon said projection, visually camouflaging the presence of said projection, said camouflaging means not interfering with the touch perceptibility of said projection.

8. A programmed learning text according to claim 7, wherein the camouflaging means comprises a predetermined pattern printed on said page and covering said projection.

9. A programmed learning text according to claim 8, wherein said pattern is a mottled design of a plurality of shades of at least one color.

10. A programmed learning text for learning the answer to a self-test question, comprising:
- a sheet of material having a plurality of adjacent indicia corresponding to a plurality of possible answers to said self-test question;
- identifying means perceptible by touch on said sheet adjacent one of said indicia; and
- camouflage means upon said identifying means, visually camouflaging the presence of said identifying means, said camouflaging means not interfering with the touch perceptibility of said identifying means.

11. A programmed learning text according to claim 10, wherein the camouflage means comprises a predetermined pattern printed on said page surrounding said projection.

12. A programmed learning text for learning the answer to a self-test question, comprising:
- a sheet of material having a plurality of adjacent indicia corresponding to a plurality of possible answers to said self-test question;
- at least one projection, perceptible by touch, embossed in said sheet adjacent one of said indicia; and
- camouflage means upon said projection, visually camouflaging the presence of said projection, said camouflaging means not interfering with the touch perceptibility of said projection.

13. A programmed learning text according to claim 12, wherein the camouflaging means comprises a predetermined pattern printed on said page surrounding said projection.

* * * * *

UNITED STATES PATENT AND TRADEMARK OFFICE
CERTIFICATE OF CORRECTION

PATENT NO. : 4,552,536

DATED : November 12, 1985

INVENTOR(S) : Andrew F. Kay; David A. Kay

It is certified that error appears in the above-identified patent and that said Letters Patent is hereby corrected as shown below:

Column 4, line 5, delete "ansers" and insert --answers--; and

Column 4, line 12, delete "camouflaing" and insert --camouflaging--.

Signed and Sealed this

Fourth Day of March 1986

[SEAL]

Attest:

DONALD J. QUIGG

Attesting Officer

Commissioner of Patents and Trademarks